INVENTORS
M.E. REINECKE
B.O. AYERS
BY
*Hudson & Young*
ATTORNEYS

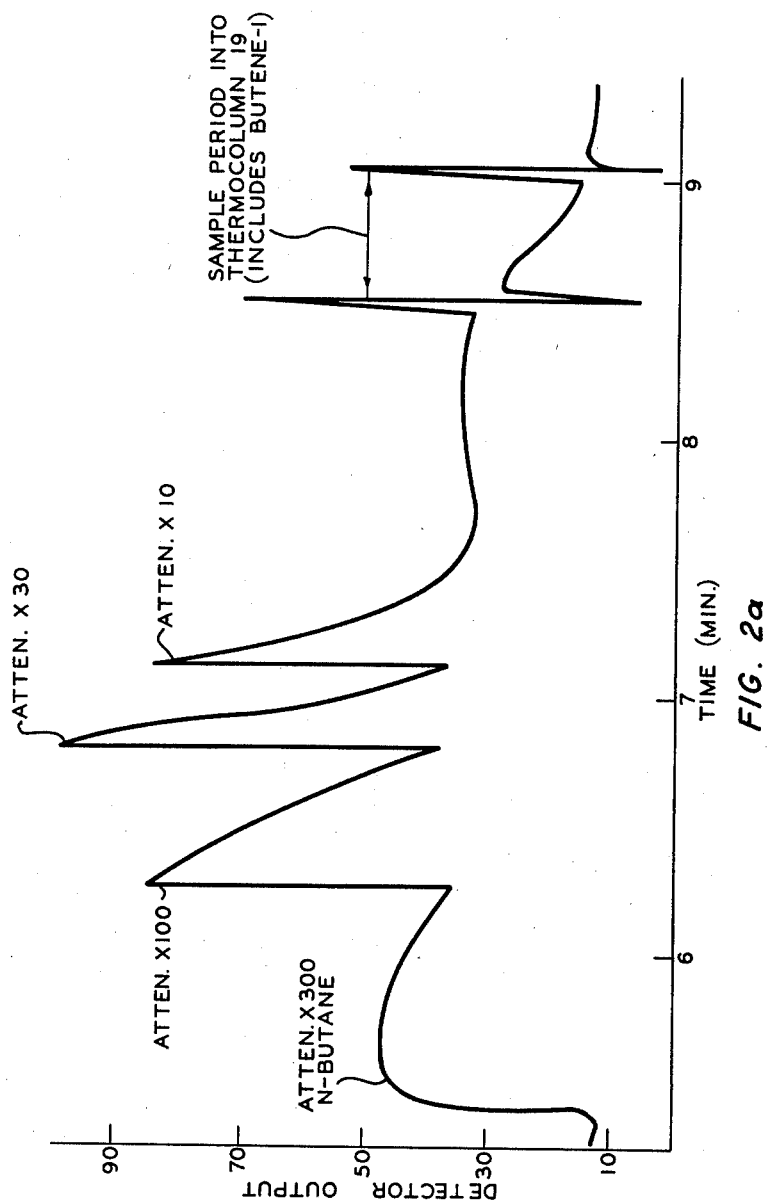

INVENTORS
M.E. REINECKE
B.O. AYERS
BY Hudson & Young
ATTORNEYS

United States Patent Office 3,168,823
Patented Feb. 9, 1965

3,168,823
THERMOCHROMATOGRAPHIC METHOD
AND APPARATUS FOR SEPARATION
AND CONCENTRATION
Marvin E. Reinecke and Buell O. Ayers, Bartlesville,
Okla., assignors to Phillips Petroleum Company, a corporation of Delaware
Filed July 18, 1960, Ser. No. 43,536
10 Claims. (Cl. 73—23.1)

This invention relates to an improved method of analyzing fluid streams.

There is a need for analytical procedures capable of measuring small concentrations of fluid stream constituents for industrial and laboratory operations. One method of analyzing such streams involves the use of a chromatographic analyzer. In chromatography, a sample of the material to be analyzed is introduced, as a vapor, into a column containing a selective sorbent or partitioning material. A carrier gas is directed into the column so as to force the sample material therethrough. The selective sorbent, or partitioning material, attempts to hold the constituents of the mixture. This results in the several constitutents of the fluid mixture flowing through the column at different rates of speed, depending upon their affinities for the packing material. The column effluent thus consists initially of the carrier gas alone, the individual constituents of the fluid mixture appearing later at spaced time intervals. A conventional method of detecting the presence and concentration of these constituents is to employ a thermal conductivity detector which compares the thermal conductivity of the effluent gas wtih the thermal conductivity of the carrier gas directed to the column.

Chromatographic analyzers of the type described have proven to be quite useful. However, it is difficult to determine the concentration of a constituent of low concentration and to determine with a high degree of accuracy the exact concentration of various constituents present.

We have discovered that the addition of a thermochromatographic column or columns to the elution or partition-type chromatographic analyzer vastly improves the efficiency of the analyzing process when said thermochromatographic column or columns are operated under specific conditions.

Accordingly, the object of this invention is to provide an improved method of analyzing a fluid stream.

Another object of this invention is to provide an improved method of fluid stream analysis by concentrating trace constituents of said fluid stream.

Another object of this invention is to provide an improved method of analyzing a fluid stream by separating and concentrating constituents of said fluid stream.

Other objects, advantages and features of our invention will be readily apparent to those skilled in the art from the following description and the appended claims.

Thermochromatographic columns are employed by the inventive process to concentrate a trace quantity of a constituent in a fluid hydrocarbon mixture, said concentration readily detected by a thermal conductivity cell, or other detector. To concentrate, as herein employed and generally understood by those skilled in the art, is to increase the concentration of the constituent so that the concentration of the said constituent in the column effluent is greater than the concentration of the said constituent in the feed to the said column. The trace constituent, represented by a recorded trace peak, is separated from the trailing edge of a larger peak which would otherwise obscure the trace peak. Thermochromatographic columns are also employed by the inventive process to sharpen peaks, giving improved peak resolution and better sensitivity.

FIGURES 2a and 2b are graphical representations of operating features of the analyzer of FIGURE 1.

Figure 1:
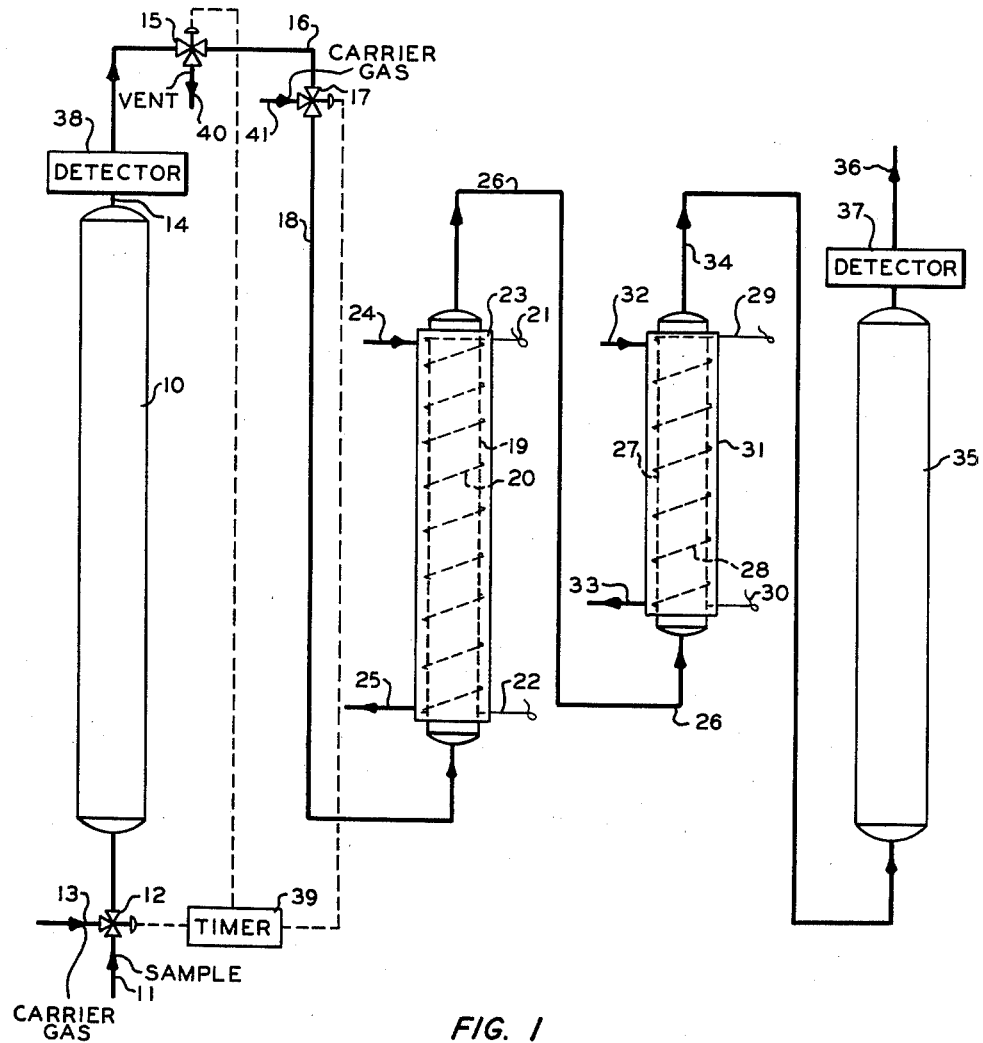
FIGURE 1 is a schematic diagram of the inventive process.

Referring to FIGURE 1, there is shown a column 10 which is filled with the packing material that selectively retards the passage therethrough of the constituents of the fluid mixture to be analyzed. A fluid sample to be analyzed is introduced, as a vapor, to the inlet of column 10 by means of a conduit 11 and a three-way control valve 12. Carrier gas is introduced into column 10 by means of a conduit 13 and control valve 12. The effluent from column 10 is removed through a conduit 14 which communicates with the inlet of a three-way control valve 15. The portion of the sample to be analyzed as determined by detector 38 is passed by means of a conduit 16 to the inlet of a three-way control valve 17. The remainder of the sample is vented by means of a conduit 40. Carrier gas is introduced into the second inlet of valve 17 through a conduit 41. The outlet of valve 17 is connected by a conduit 18 to the inlet of a second column 19.

Figure 3:
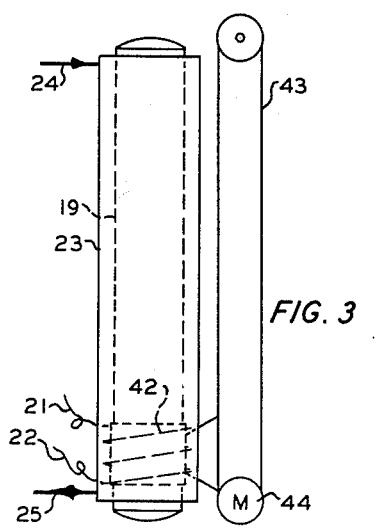
FIGURE 3 is a schematic diagram of an alernate means of heating column 19 of FIGURE 1.

Column 19 is filled with a material which selectively retards the passage therethrough of the constituents of the fluid mixture to be analyzed. Column 19 is provided with electrical heating coil 20 and an electrical current is supplied to said coil by leads 21 and 22. It is within the scope of this invention to employ other methods of heating column 19, such as moving a heater adjacent the column from the inlet to the outlet thereof, as illustrated in FIGURE 3, for example. A heating coil 42 can be moved from the inlet to the outlet of column 19 by means of a moving chain 43, said chain 43 driven by a motor 44. Column 19 is also provided with a jacket 23 and a means of introducing a cooling medium to said jacket through a conduit 24 and withdrawing said cooling medium through a conduit 25. The flow of heat and coolant to column 19 can be controlled by conventional valving and timing means not herein illustrated. A preferred cooling medium, but not necessarily limited thereto, is air supplied by a blower.

The effluent from column 19 is removed via a conduit 26 communicating with the inlet of a thermochromatographic column 27. Column 27 is filled with a material that selectively retards the passage therethrough of the constituents of the fluid mixture to be analyzed. Column 27 is provided with a heating coil 28 and an electrical current is transmitted to said coil 28 by means of lead wires 29 and 30. Column 27 is provided with a jacket 31 and a means of introducing the cooling medium, such as air, to said jacket through a conduit 32 and withdrawing said cooling means through a conduit 33. The flow of heat and coolant to column 27 can be controlled by conventional valving and timing means not herein illustrated. It is within the scope of the invention to provide other means of heating and cooling column 27.

Effluent is removed from column 27 by means of a conduit 34 and passed to an elution or partition-type column 35. Column 35 is filled with a packing material that selectively retards the passage therethrough of the constituents of a fluid mixture to be analyzed. The outlet of column 35 communicates with a vent conduit 36 via detector 37.

Detecting cells 37 and 38 are disposed in respective conduits 36 and 14. These detectors are adapted to measure a property of the fluid sample mixture directed thereto, which property is representative of the composition of the fluid mixture. The detectors can be thermal conductivity cells which include temperature sensitive rresistance elements disposed in the path of fluid flow. A reference element, not shown, can be disposed in the carrier gas flow. The temperature differences between the resistance elements can be measured by electrical bridge circuits, such as a Wheatstone bridge. However, the detectors can also be any other type of apparatus known in the art for measuring a property of a gaseous stream.

Control valves 12, 15 and 17 are operated by a timer 39. This timer provides output signals that operate the valves in sequence. This timer can be any type of apparatus known in the art for providing control signals in a desired sequence. One common type of timer which can be employed utilizes a series of cam operated switches wherein associated cams are rotated by a timing motor.

In order to describe the operation of the analyzer of this invention, reference is made to specific analysis of a hydrocarbon mixture having the following compositions:

| | Vol. percent |
|---|---|
| Propane | 37 |
| Isobutane | 16 |
| Normal butane | 45 |
| Butene-1 | Trace |
| Isopentane | 2 |

Column 10 was formed of 12 feet of ⅜ inch tubing containing 35–60 mesh chromosorb supporting 30 weight percent of dimethylsulfolane. Column 19 was formed of 10 inches of ¼ inch tubing containing silica gel. Column 27 was formed of 2 inches of ¼ inch tubing containing silica gel. Column 35 was formed of 6 feet of ¼ inch tubing containing 35–60 mesh chromosorb supporting 30 weight percent of dimethylsulfolane. Helium was employed as a carrier gas and was supplied by conduit 13 at a rate of 102.5 cc./minute and to conduit 18 at the rate of 99 cc./minute. The sample mixture to be analyzed was supplied as a vapor at the same rate and was supplied for a period of 30 seconds.

Figure 2B:
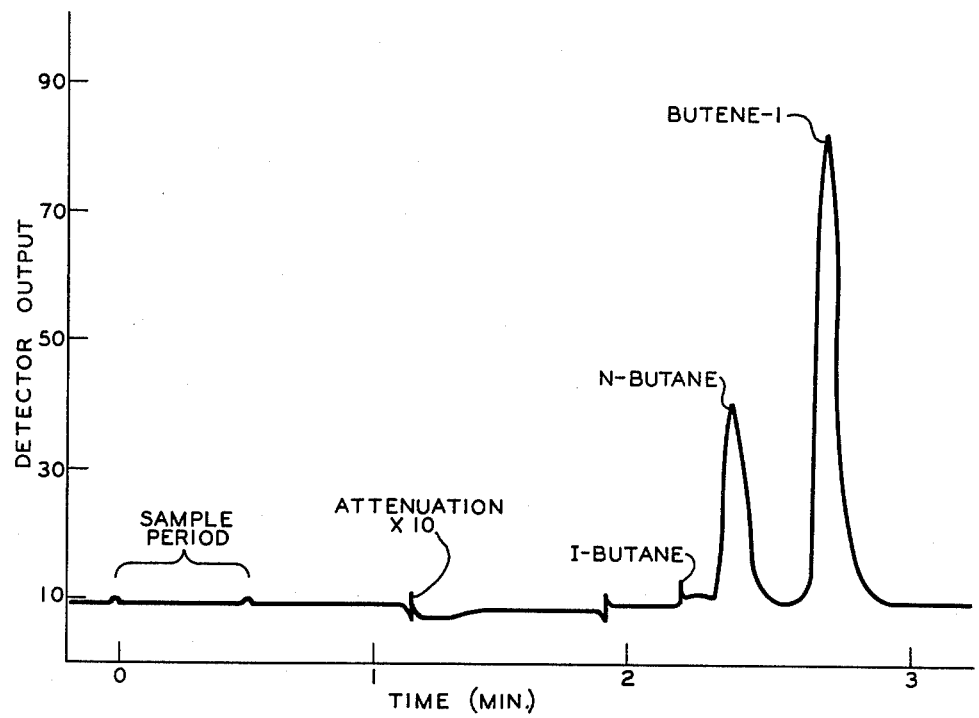

FIGURE 2a illustrates the portion of the output signal of detector 38 showing the n-butane peak containing the trace constituent, butene-1. To obtain the chromatogram of FIGURE 2a, the sample was passed from column 10 through detector 38, valve 15 and conduit 40 until the portion of the normal butane designated in FIGURE 2a containing the butene-1 trace was introduced into valve 15. At this time the sample was passed by means of conduit 16 to valve 17. The breaks in the curve of FIGURE 2a on either side of the sample period are due to changes in system pressure effected when valves 15 and 17 are repositioned. Carrier gas at the aforementioned rate was then introduced through conduit 41, forcing the portion of the sample containing the trace constituent, butene-1, into column 19. Column 19 had been previously cooled to a consistent base temperature of 100° F. by means of an air blower. Heat was applied to column 19 rapidly over its entire length, heating said column 19 to 400° F., so as to cause the butene-1 trace constituent to be of much higher concentration in the carrier gas than when said trace constituent was admitted to column 19. The carrier gas containing a trace constituent was then passed to column 27, previously cooled in the same manner as column 19. As the sample constituents were introduced into column 27 at a higher concentration than into column 19, said sample constituents were absorbed in a shorter column length. Column 27 was then heated rapidly over its entire length to a temperature of 400° F., so as to further concentrate the trace constituent. The carrier gas containing the trace constituent was then passed to an elution column 35. Column 35 served to separate the butene-1 trace constituent from the n-butane portion of the sample yet remaining in the carrier gas. Detector 37 provides the output signal noted in FIGURE 2b.

It can readily be seen from FIGURE 2b that the butent-1 trace constituent has been concentrated and the exact concentration of butene-1 in the original sample easily ascertained. It will be understood by those skilled in the art that the peaks of FIGURE 2a marked as Atten.×100, Atten.×30 and Atten.×10 occurred as a result of changing the attenuation setting of the instrument originally set at Atten.×300. A detector emits elector emits electrical output signals that must be adjusted in order to conveniently record on a chart signals representative of the concentrations of constituents of a fluid mixture. Thus, the attenuation factors of 10, 30, 100 and 300 are multiples used to determine the actual magnitude of the output signals.

It is within the scope of this invention to eliminate the second thermochromatographic column from the inventive process. Under such conditions, column 19 is operated so as to concentration constituents and column 35 is employed to separate the resulting peaks.

It is within the scope of this invention to separate and concentrate constituents of low concentration by passing a sample portion, or portions, of the effluent from column 10 containing constituents of low concentration to column 19. Column 19 is then heated at a uniform time rate over its entire length rather than heating said column rapidly. As the column affinity decreases as the temperature rises, constituents will move along in the column at different rates depending upon their affinity. The first constituent to thus be removed from column 19 is the one for which the column has the least affinity, the second constituent is the next in affinity, and so forth. This process is continued until the column attains its maximum temperature, at which time the last constituent will have been expelled. At this time, column 19 is rapidly cooled in preparation for the next cycle. As each constituent is passed from column 19 into column 27, it is resorbed on a very short length of the column. By proper programming, column 27 is heated suddenly to a predetermined temperature, such as 400° F., which immediately drives the constituent from the column. By programming, reference is made to a conventional process wherein the time required for each constituent to pass through column 19 is predetermined and the heating and cooling cycles of column 27 timed responsive to this predetermination. The time can be predetermined by passing the effluent from column 19 to a detector on a trial sample run conducted previous to the actual sample analysis. Column 27 is then rapidly cooled to a base temperature, such as 100° F., ready for the next contsituent. One constituent is expelled from column 27 for each cycle of the programming. These constituents can then be passed to an elution column 35 to further separate the constituents. An alternate method to produce greater separation between constituents, represened by peaks, would be to heat and cool, in succession, columns 19 and 27 as peak is evolved.

As will be evident to those skilled in the art, various modifications of this invention can be made, or followed, in the light of the foregoing disclosure and discussion, without departing from the spirit or scope thereof.

We claim:

1. A method of analyzing a fluid mixture which comprises introducing a vaporized fluid mixture to be analyzed into the inlet of a first zone which contains a material that selectively retards passage therethrough of the constituents of said mixture, introducing a carrier gas into the inlet of said first zone, measuring a property of the effluent from said first zone which is representative of the composition thereof, passing only a portion of the effluent from said first zone containing a constituent of said fluid mixture of low concentration to the inlet of a second zone, said second zone containing a material that selectively retards passage therethrough of the constituents of said mixture, heating said second zone rapidly, thus passing the effluent containing said constituent in a concentrated form from said second zone to the inlet of a third zone, said third zone containing a material that selectively retards passage therethrough of the constituents of said mixture, cooling said second zone, heating said third zone rapidly thus passing the effluent containing said constituent in a more highly concentrated form from said third zone to the inlet of a fourth zone containing a material that selectively retards the passage therethrough of the constituents of said mixture, cooling said third zone, and measuring a property of the effluent from said fourth zone which is representative of the composition thereof.

2. The process of claim 1 wherein said third zone is a contracted duplication of said second zone.

3. A method of analyzing a fluid mixture which comprises introducing a vaporized fluid mixture to be analyzed into the inlet of a first zone which contains a material that selectively retards passage therethrough of the constituents of said mixture, introducing a carrier gas into the inlet of said first zone, passing only a portion of the effluent from said first zone containing a constituent of said fluid mixture of low concentration into the inlet of a second zone containing a material that selectively retards passage therethrough of the constituents of said mixture, maintaining continuously a vapor phase containing a portion of said fluid mixture within said second zone upon the introduction of said portion of said first zone effluent thereto and until said second zone is heated, heating simultaneously all of said second zone rapidly, passing the effluent from said second zone to the inlet of a third zone containing a material that selectively retards passage therethrough of the constituents of said mixture, said second zone effluent containing a higher concentration of said constituent of low concentration than the concentration of said constituent of low concentration passed to said second zone, and measuring a property of the effluent from said third zone which is representative of the composition thereof.

4. A method of analyzing a fluid mixture which comprises introducing a vaporized fluid mixture to be analyzed into the inlet of a first zone which contains a material that selectively retards passage therethrough of the constituents of said mixture, introducing a carrier gas into the inlet of said first zone, measuring a property of the effluent from said first zone which is representative of the composition thereof, passing only a portion of the effluent from said first zone containing constituents of said fluid mixture of low concentration to the inlet of a second zone, said second zone containing a material that selectively retards passage therethrough of the constituents of said mixture, progressively heating sections of said second zone from the inlet thereof to the outlet thereof thus passing the effluent containing said constituent in a concentrated form from said second zone to the inlet of a third zone containing a material that selectively retards the passage therethrough of the constituents of said mixture, rapidly cooling said second zone, alternately heating and cooling said third zone rapidly, passing the effluent containing said constituent in a more highly concentrated form from said third zone to the inlet of a fourth zone containing a material that selectively retards passage therethrough of the constituents of said mixture, and measuring a property of the effluent from said fourth zone which is representative of the composition thereof.

5. A method of analyzing a fluid mixture which comprises introducing a vaporized fluid mixture to be analyzed into the inlet of a first zone which contains a material that selectively retards passage therethrough of the constituents of said mixture, introducing a carrier gas into the inlet of said first zone, measuring a property of the effluent from said first zone which is representative of the composition thereof, passing only a portion of the effluent from said first zone to the inlet of a second zone containing a material that selectively retards passage therethrough of the constituents of said mixture, progressively heating said second zone from the inlet thereof to the outlet thereof, passing the effluent from said second zone to the inlet of a third zone containing a material that selectively retards passage therethrough of the constituents of said mixture, rapidly cooling said second zone, alternately heating and cooling said third zone rapidly as each constituent passes into and from said third zone, respectively, as effluent, passing said effluent from said third zone to the inlet of a fourth zone containing a material that selectively retards passage therethrough of the constituents of said mixture, and measuring a property of the effluent from said fourth zone which is representative of the composition thereof.

6. A method of analyzing a fluid mixture which comprises introducing a vaporized fluid mixture to be analyzed into an inlet of a first zone containing a material that selectively retards passage therethrough of the constituents of said mixture, introducing a carrier gas into the inlet of said first zone, measuring a property of the effluent from said first zone which is representative of the composition thereof, passing only a portion of the effluent from said first zone to the inlet of a second zone containing a material that selectively retards the passage therethrough of the constituents of said mixtures, progressively heating sections of said second zone from the inlet thereof to the outlet thereof, passing the effluent from said second zone to the inlet of a third zone containing a material that selectively retards passage therethrough of a constituent of said mixture, rapidly cooling said second zone in preparation for the next cycle, alternately heating and cooling said third zone rapidly as each constituent of said effluent from said second zone passes into and from said third zone, respectively, and measuring a property of the effluent from said third zone which is representative of the composition thereof.

7. Apparatus for analyzing a fluid mixture comprising first, second, third and fourth columns, each adapted to contain a material which selectively retards passage therethrough of the constituents of a fluid mixture to be analyzed; first conduit means communicating with inlet of said first column to introduce a fluid mixture to be analyzed; second conduit means communicating with the inlet of said first column to introduce a carrier gas; third conduit means communicating between the outlet of said first column and the inlet of said second column; fourth conduit by-pass means communicating with said third conduit means upstream of said second column to vent the effluent from said first column; fifth conduit means communicating with said third conduit means downstream of said fourth conduit means to introduce a carrier gas; means for rapidly heating said second column; means of cooling said second column; sixth conduit means communicating between the outlet of said second column and the inlet of said third column; means for rapidly heating said third column; means of cooling said third column; seventh conduit means communicating between the outlet of said third column and the inlet of said first and fourth columns; and means to measure a property of the effluent from said fourth columns which is representative of the composition thereof.

8. The apparatus of claim 7 wherein there is supplied a means of moving said first heater from the inlet to the outlet of said second column.

9. Apparatus for analyzing a fluid mixture comprising first, second, and third columns, each adapted to contain a material which selectively retards passage therethrough of the constituents of the fluid mixture to be analyzed; first conduit means communicating with the inlet of said first column to introduce a fluid mixture to be analyzed; second conduit means communicating with the inlet of said first column to introduce a carrier gas; third conduit means communicating between the outlet of said first column and the inlet of said second column; fourth conduit by-pass means communicating with said third conduit means upstream of said second column to vent the effluent from said first column; fifth conduit means communicating with said third conduit means downstream of said fourth conduit means to introduce a carrier gas; a first heater in thermal contact with said second column; means to move said heater from the inlet of said second column to the outlet thereof; sixth conduit means communicating between the outlet of said second column and the inlet of said third column; means for heating said third column rapidly; means of cooling said third column; and means to measure a property of the effluent from said first and third columns which is representative of the composition thereof.

10. A method of analyzing fluid mixtures which comprises introducing as a vapor a fluid mixture to be analyzed into the inlet of a first zone which contains a material that selectively retards passage therethrough of the constituents of said mixture, introducing a carrier gas into the inlet of said first zone, measuring a property of the effluent from said first zone which is representative of the composition thereof, passing only a portion of the effluent from said first zone to the inlet of a second zone which contains a material that selectively retards passage therethrough of the constituents of said mixture, maintaining continuously a vapor phase containing a portion of said fluid mixture within said second zone upon the introduction of said portion of said first zone effluent thereto and until said second zone is heated, heating simultaneously all of said second zone rapidly, thus passing an effluent from said second zone having a greater concentration of a constituent of interest than the concentration of said constituent of interest in the effluent in said portion of said effluent passed from said first zone to the inlet of said second zone, and measuring a property of said effluent from said second zone which is representative of the composition thereof.

References Cited in the file of this patent
UNITED STATES PATENTS

| | | |
|---|---|---|
| 2,398,818 | Turner | Apr. 23, 1946 |
| 2,868,011 | Coggeshall | Jan. 13, 1959 |
| 3,053,077 | Tracht | Sept. 11, 1962 |

OTHER REFERENCES

Analytical Chemistry, article by M. Dimbat et al., pp. 290–297, vol. 28, No. 3, March 1956.

Vapour Phase Chromatography, by D. H. Desty, published in London by Butterworths Scientific Publications 1957 (pp. 291–303 relied on).

Zarodskaia Labs. article Turkel taub, pp. 1120 to 1124, vol 23, No. 9, September 1957.

Vapour Phase Chromatography, edited by D. H. Desty, Butterworth Scientific Publications 1957 (pp. 3 and 215.)

Analytical Chemistry article by Simmons et al. pp. 32 to 35, vol. 30, No. 1, January 1958.

UNITED STATES PATENT OFFICE
CERTIFICATE OF CORRECTION

Patent No. 3,168,823                                 February 9, 1965

Marvin E. Reinecke et al.

It is hereby certified that error appears in the above numbered patent requiring correction and that the said Letters Patent should read as corrected below.

Column 6, lines 56 to 59, for "the outlet of said third column and the inlet of said first and fourth columns; and means to measure a property of the effluent from said fourth columns which is representative of the composition thereof." read -- the outlet of said third column and the inlet of said fourth column; and means to measure a property of the effluent from said first and fourth columns which is representative of the composition thereof. --.

Signed and sealed this 10th day of August 1965.

(SEAL)
Attest:

ERNEST W. SWIDER
Attesting Officer

EDWARD J. BRENNER
Commissioner of Patents